United States Patent
LeBlanc et al.

(10) Patent No.: US 9,704,281 B2
(45) Date of Patent: Jul. 11, 2017

(54) SYSTEMS AND METHODS FOR CREATION AND SHARING OF SELECTIVELY ANIMATED DIGITAL PHOTOS

(71) Applicant: FLIXEL PHOTOS INC., Toronto (CA)

(72) Inventors: Philippe Louis LeBlanc, Toronto (CA); Mark Harris Pavlidis, Toronto (CA); Bretton James MacLean, Picton (CA)

(73) Assignee: FLIXEL PHOTOS INC., Toronto ON (CA)

( * ) Notice: Subject to any disclaimer, the term of this patent is extended or adjusted under 35 U.S.C. 154(b) by 424 days.

(21) Appl. No.: 14/377,732

(22) PCT Filed: Feb. 11, 2013

(86) PCT No.: PCT/CA2013/000116
§ 371 (c)(1),
(2) Date: Aug. 8, 2014

(87) PCT Pub. No.: WO2013/116937
PCT Pub. Date: Aug. 15, 2013

(65) Prior Publication Data
US 2015/0324096 A1 Nov. 12, 2015

Related U.S. Application Data

(60) Provisional application No. 61/596,908, filed on Feb. 9, 2012.

(51) Int. Cl.
*G06T 13/80* (2011.01)
*G06F 3/0484* (2013.01)
(Continued)

(52) U.S. Cl.
CPC .......... *G06T 13/80* (2013.01); *G06F 3/04842* (2013.01); *G06F 3/04845* (2013.01);
(Continued)

(58) Field of Classification Search
CPC .... G06T 13/00–13/80; G06F 3/0488–3/04886
See application file for complete search history.

(56) References Cited

U.S. PATENT DOCUMENTS

| 2005/0052705 A1 | 3/2005 | Hersch |
| 2008/0140502 A1* | 6/2008 | Birnholz ................ G06Q 30/02 |
| | | 705/14.72 |

(Continued)

OTHER PUBLICATIONS

Bahena, Marco. Video titled "Quick tutorial—Cinemagraphs with single mask Photoshop CS5—English Captions" and select screen shots, Uploaded on May 27, 2011; https://www.youtube.com/watch?v=CJVZQNIAB9w.*

(Continued)

*Primary Examiner* — Daniel Hajnik
(74) *Attorney, Agent, or Firm* — Norton Rose Fulbright Canada LLP; Niall Cooney

(57) ABSTRACT

A method of generating distributable and/or shareable selectively animated images comprising the steps of: (a) opening a client computer program, implemented as client computer program loaded on a mobile device; (b) capturing or accessing a video content; (c) using a user interface of the client computer program, a user drawing a path or region on an image frame from the video content to be animated ("animated region"), wherein the client computer program generated based on the animated region a mask, wherein the mask represents the static portion of a selectively animated image, and the mask is operable to mask underlying animated regions; and (d) the client computer program initiating, at the mobile device or via a server linked to the mobile device, the composition of a series of images including user selected animated regions, by rendering an animated image based on mask and the underlying masked animated regions. A computer program is provided for implementing the steps of the method, which may consist of a mobile application.

(Continued)

The computer program may include a server application that cooperates with the mobile application for enabling the animated image composition processes and/or distribution and sharing of the animated images. A computer system is provided that includes a mobile device implementing the mobile application and optionally a server implementing the server application.

13 Claims, 4 Drawing Sheets

(51) Int. Cl.
    *H04N 21/81* (2011.01)
    *H04N 21/414* (2011.01)
    *H04N 1/00* (2006.01)
    *H04N 21/4223* (2011.01)
    *H04N 21/472* (2011.01)
    *H04N 21/4728* (2011.01)
    *G11B 27/034* (2006.01)
    *H04N 1/32* (2006.01)
    *H04N 21/44* (2011.01)
    *H04N 21/475* (2011.01)
    *H04N 21/488* (2011.01)

(52) U.S. Cl.
    CPC ........ *G06F 3/04847* (2013.01); *G11B 27/034* (2013.01); *H04N 1/00137* (2013.01); *H04N 1/00148* (2013.01); *H04N 1/00161* (2013.01); *H04N 1/00167* (2013.01); *H04N 21/41407* (2013.01); *H04N 21/4223* (2013.01); *H04N 21/4728* (2013.01); *H04N 21/47205* (2013.01); *H04N 21/8153* (2013.01); *G06T 2207/10016* (2013.01); *G06T 2213/00* (2013.01); *H04N 1/32144* (2013.01); *H04N 21/44008* (2013.01); *H04N 21/4755* (2013.01); *H04N 21/4882* (2013.01); *H04N 2201/3267* (2013.01); *H04N 2201/3273* (2013.01); *H04N 2201/3278* (2013.01)

(56) References Cited

U.S. PATENT DOCUMENTS

| | | |
|---|---|---|
| 2009/0089710 A1 | 4/2009 | Wood |
| 2009/0140887 A1 | 6/2009 | Breed |
| 2010/0188415 A1* | 7/2010 | Pettigrew ............... H04N 1/622 345/589 |
| 2010/0210332 A1* | 8/2010 | Imai ........................ A63F 13/10 463/7 |
| 2010/0259545 A1 | 10/2010 | Elnatan |
| 2011/0255775 A1 | 10/2011 | McNamer |

OTHER PUBLICATIONS

"Vfx haiku", Video titled "How to make a Cinemagraph with Photoshop and After Effects" and select screen shots, Posted on: May 2, 2011; http://vfxhaiku.com/2011/05/how-to-make-a-cinemagraph/.*

Liu, Ce, et al. "Motion magnification." ACM transactions on graphics (TOG) 24.3 (2005): 519-526.*

Patent Cooperation Treaty, Written Opinion and International Search Report for PCT/CA2013/000116 dated Apr. 19, 2013.

* cited by examiner

SYSTEMS AND METHODS FOR CREATION AND SHARING OF SELECTIVELY ANIMATED DIGITAL PHOTOS

PRIORITY

This application claims priority under 35 USC §119(e) of U.S. Provisional Patent Application No. 61/596,208 filed on Feb. 9, 2012, the contents of which are hereby incorporated by reference.

FIELD OF THE INVENTION

The present invention relates generally to computer systems and more specifically to methods and systems for creation, distribution, and sharing, of digital media content. The present invention relates more specifically to methods and systems for creation, distribution, and sharing of selectively animated digital photos.

BACKGROUND OF THE INVENTION

People like to take and share photos. There is increased interest in taking photos from mobile devices, and then sharing photos using a mobile device, whether using a mobile application, or by accessing a remote Internet service using a mobile device.

There is interest in more, and more engaging, content especially to meet the demands of consumers for content that is easy to create and to share through their social networks. Social media creates significant demand for content that can be created and shared regularly through social networks, and that is interesting to recipients. The pursuit of a significant social media footprint by a large number of consumers through social networks, and associated business models that target these consumers through social networks, means that digital media platforms that allow consumers to create and share this content easily and efficiently, can be very valuable.

Video content in particular is very popular, and this has resulted in the growing interest in interactive content. Creation and consumption of content from a mobile device is advantageous to users who are on the go, and for many activities users do not want to be tethered to a desktop computer. In fact increasingly computer users are mobile computing users. As a result there is growing interest in technologies that enable the creation of content using smart phones and tablet computers for example.

A fairly new form of visual content has emerged recently, namely selectively animated photographs sometimes referred to as "cinemagraphs", "cinegraphs" or "living photographs". These consist of still photographs in which a selected area is animated or moves. This animation or movement may occur once, or may be repeated. These selectively animated photographs are referred to as "cinemagraphs" in this disclosure.

Cinemagraphs generally convey to the viewer the impression that s/he is consuming video. Moreover, design choices as to what portions of an image are animated and which are not can result in very interesting and beautiful compositions, for which there is increasing demand.

A number of methods for creating cinemagraphs are known in the art. These generally involve taking a series of photographs or a video recording, and using an image editing computer program to create a seamless loop of sequential image frames, and then using an animated GIF file format for example, to create the animated portions of the living images.

There is growing interest in cinemagraphs, however, generally speaking publicly available methods are relatively complicated, and quite time consuming. There is a need for a more streamlined, simpler, and/or shorter method for creating cinemagraphs.

Also, conventional methods for creating cinemagraphs generally require the use of computer programs such as PHOTOSHOP™ that typically cannot run on mobile devices, and even on tablet computers operation of such computer programs as PHOTOSHOP™ may not operate optimally.

There is a need therefore for a method that enables the creation of cinemagraphs efficiently, and that provides an intuitive workflow that allows consumers to creating beautiful cinemagraphs using a computer device, including a smart phone or a tablet computer. There is a further need for a computer system and a computer program, operable on a mobile device, that enables the creation of cinemagraphs.

SUMMARY OF THE INVENTION

In one aspect, a method of generating distributable and/or shareable selectively animated images comprises: opening a client computer program, implemented as a client computer program loaded on a mobile device; capturing or accessing video content; a user using a user interface of the client computer program to: (a) select one or more base frames from the video content for use as a still image or images; and (b) draw or paint one or more paths or regions on the one or more base frames so as to select a path or region of the one or more base frames to be animated using moving content from the video content ("animated region(s)"); and compiling one or more parameters related to the animated region(s), and also optionally one or more other parameters generated using one or more editing features or utilities of the client computer program, so as to define a set of instructions for creating selectively animated images within the animated region(s), based on the video content, and the client computer program initiating, at the mobile device or via a server linked to the mobile device, the composition of a series of images including user selected animated regions, by rendering one or more animated images based on the one or more base frames and selected animated region(s).

In another aspect, the method comprises the client computer program displaying a mask as an overlay over the one or more base frames, wherein the mask represents the region of the one or more base frames that will remain still, wherein the user draws on or paints on the mask, and thereby removes portions of the mask, and these portions are used to select the animated region(s).

In another aspect, the method comprises a further step of displaying to the user a preview of the selective animated images by displaying the one or more base images as a still image or images, and revealing underneath the aligned portions of the moving content in the animated region(s).

In a till other aspect, the method comprises the further steps of playing the video content, while displaying in the background a transparency showing the currently selected one or more base frames; and the user in a selectively animated image creation mode touching selected regions of a touch screen display of the mobile device, thereby initiating the client computer program to display a mask consisting of the one or more base frames, as an overlay to the moving content, thereby permitting the user to touch the touch screen so as to select portions of the mask and thereby selected portions of the one or more base frames for animation.

In a still other aspect, the method comprises: dynamically displaying a preview of the current selectively animated images based on the portions of the one or more base frames selected for animation, upon the user ceasing touch input to the selected regions of the touch screen display of the mobile device.

In yet another aspect, the method comprises the steps of the user iteratively providing the one or more parameters for the animated region(s) by touching selected regions of the touch screen display and viewing a corresponding preview, until the user provides input to the client computer program indicating completion of the selectively animated images.

In a still other aspect, the method comprises the further step of the client computer program automatically analyzing the video content based on one or more parameters for determining whether the video content is suitable for creating selectively animated images.

In another aspect, the method comprises the step of initiating from the mobile device, by operation of the client computer program, the distribution and/or sharing of the animated image.

In one aspect of the invention, a computer system is provided for generating distributable and/or shareable selectively animated images comprising: one or more server computers being linked to a server computer program; and at least one mobile device linked to the one more server computers, the mobile device implementing a client computer program; the server computer program and the client computer program, when executed: presenting at the mobile device a user interface enabling a user of the mobile device to: select one or more base frames from the video content for use as a still image or images; and draw or paint one or more paths or regions on the one or more base frames so as to select a path or region of the one or more base frames to be animated using moving content from the video content ("animated region(s)"); and compiling one or more parameters related to the animated region(s), and also optionally one or more other parameters generated using one or more editing features or utilities of the client computer program, so as to define a set of instructions for creating selectively animated images within the animated region(s), based on the video content, and the client computer program initiating, at the mobile device or at the one or more server computers, the composition of a series of images including user selected animated regions, by rendering one or more animated images based on the one or more base frames and selected animated region(s).

In another aspect of the computer system, client computer program displays a mask as an overlay over the one or more base frames, wherein the mask represents the region of the one or more base frames that will remain still, wherein when executed the client computer program permits the user to draw on or paint on the mask, and thereby remove portions of the mask, and these portions are used to select the animated region(s).

In a still other aspect of the computer system, the client computer program when executed displays to the user a preview of the selective animated images by displaying the one or more base images as a still image or images, and revealing underneath the aligned portions of the moving content in the animated region(s).

In yet another aspect of the computer system, the client computer program when executed: plays the video content, while displaying in the background a transparency showing the currently selected one or more base frames; and enables the user in a selectively animated image creation mode to touch selected regions of a touch screen display of the mobile device, thereby initiating the client computer program to display a mask consisting of the one or more base frames, as an overlay to the moving content, thereby permitting the user to touch the touch screen so as to select portions of the mask and thereby selected portions of the one or more base frames for animation.

In another aspect of the computer system, the client computer program when executed: dynamically displays a preview of the current selectively animated images based on the portions of the one or more base frames selected for animation, upon the user ceasing touch input to the selected regions of the touch screen display of the mobile device.

In a still other aspect of the computer system, the client computer program when executed enables the user to iteratively provide the one or more parameters for the animated region(s) by touching selected regions of the touch screen display and viewing a corresponding preview, until the user provides input to the client computer program indicating completion of the selectively animated images.

In another aspect of the computer system, the client computer program when executed, based on input from the user, connects to the one or more servers so as to enable the distribution and/or sharing of the selectively images based on one or more user preferences.

In this respect, before explaining at least one embodiment of the invention in detail, it is to be understood that the invention is not limited in its application to the details of construction and to the arrangements of the components set forth in the following description or the examples provided therein, or illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF THE DRAWINGS

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION

In one aspect of the invention, a novel computer system and computer implemented method for generating digital photos with user defined animated regions is provided that is easy and efficient to use, as described below.

A computer program for generating digital photos with user defined animated regions is also provided. Conveniently, the computer program described may be implemented as a mobile application; in fact the present invention in large part is explained by referring to a mobile application embodiment of the present invention. It should be understood, however, that the present invention may be implemented as a tablet computer program, and further may also be implemented as an Internet application or a desktop application that provides improved ease of use over prior art solutions for creating similar content. Certain aspects of the invention may also be implemented as one or more hardware/middleware functions of a relevant computer device, such as a mobile device or a tablet computer.

The term "mobile device" as used in this disclosure refers to any manner of wireless device including computing resources capable to initiate the functions described and includes for example a smart phone.

In regards to the functions described, it should be understood that the various features of the mobile application described may be implemented as part of a client server architecture, where aspects of the mobile application may be implemented to a server application, such that creation of digital photos with user defined animated regions occurs by operation of a server application for example, linked to a server, which server is accessible from the mobile device via an mobile Internet connection for example. The explanation of the invention by reference to operations of the mobile application should not be read as limiting implementation of the invention to a mobile application implementation only.

General Description of Product and Computer Implemented Method

What follows is a description of possible elements of a computer system of the present invention (including a mobile device), and also possible steps of a computer implemented method of the present invention, based on a particular workflow for creating cinemagraphs in an efficient and engaging way that provides a compelling user experience. A skilled reader will understand that particularly on a mobile device, designing the workflow that is easy to use and appeals to smart phone users in particular requires development of user insights and resolution of technical challenges. As such the invention represents an important contribution to the art.

Figure 1:
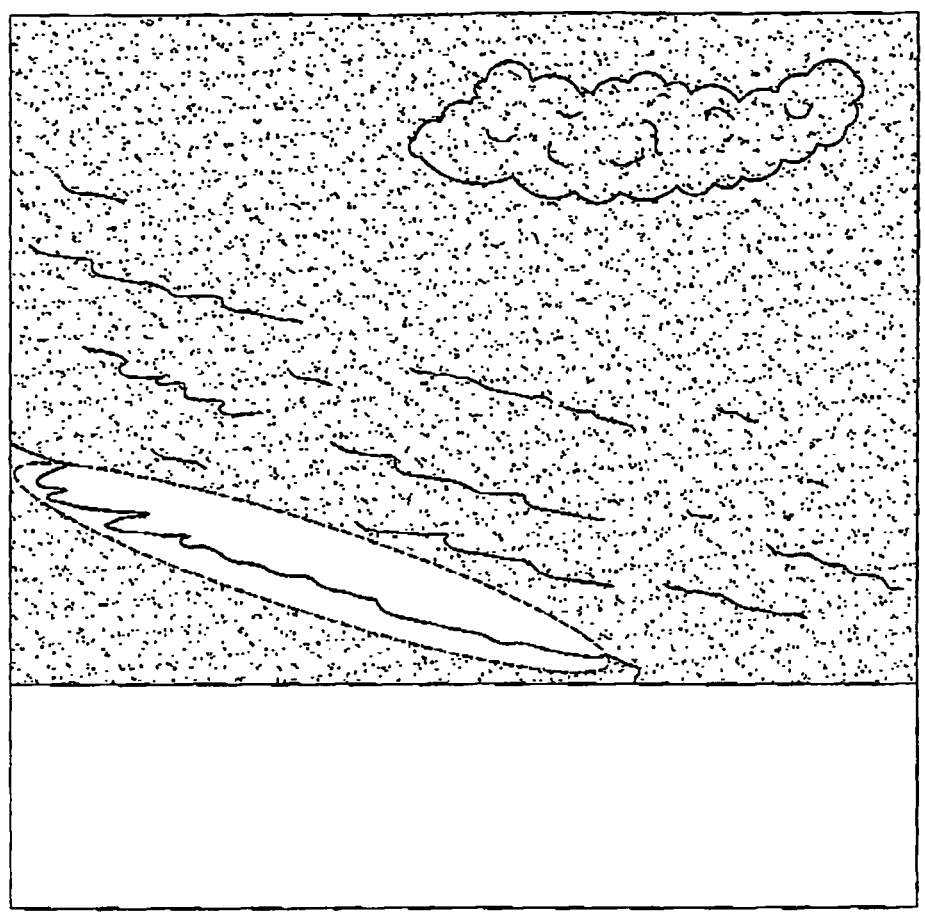
FIGS. 1-2 are a series of representative screens of the mobile application of the present invention that illustrate the overall method of the invention, and the program workflow for the mobile application of the invention.
Figure 2:
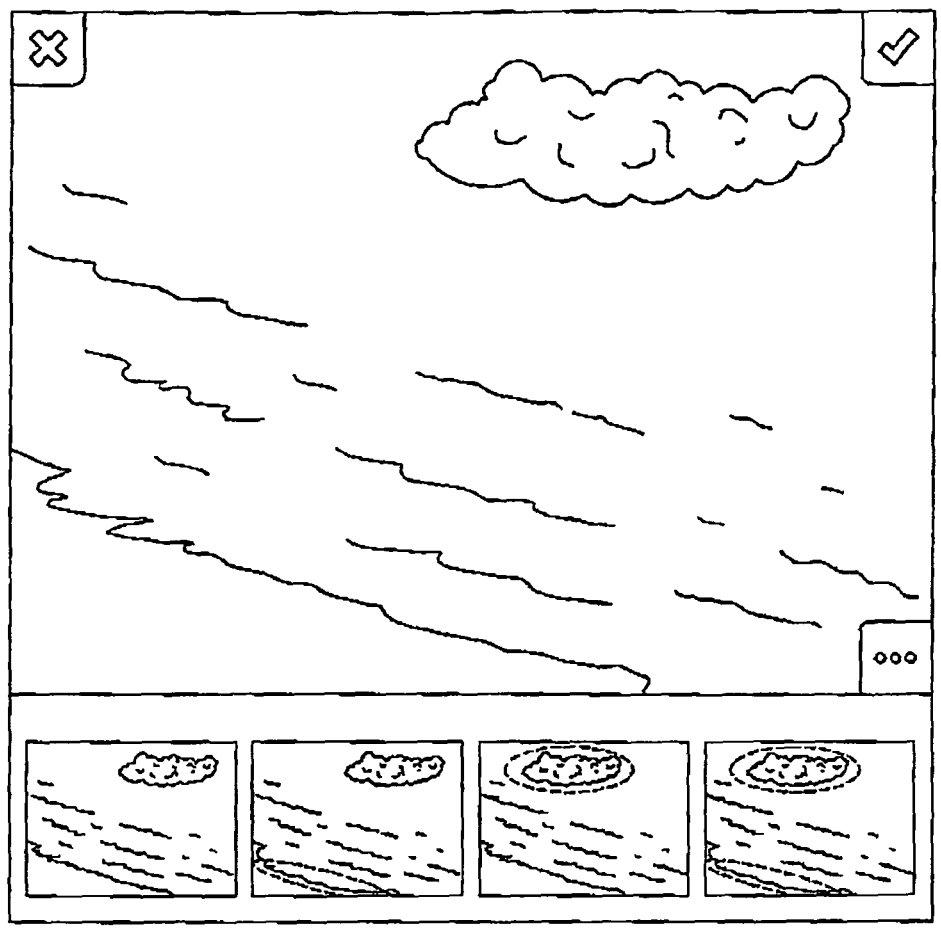

FIGS. 1 and 2 represent an example of implementation of the present invention, and more particularly a possible user interface design for enabling a user to initiate the execution of the computer implemented method of the present invention. FIGS. 1 and 2 more particularly illustrate the operation of the streamlined workflow described below. FIGS. 1 and 2 are also indicative of general elements of a user interface that presents, as described below, on a display of a mobile device (including touch input elements), a base image (or "anchor" image), and touch initiated functionality that allows a user to selectively determine portions of the base image to animate using associated video content.

More particularly:

(1) A video segment is captured, for example using a camera of a mobile device, in a video capture mode.

(2) Optionally, the video segment captured is analyzed to determine whether it meets one or more quality thresholds related to creating a cinemagraph. In one aspect, a threshold is established for video shake, and if shake is detected past the threshold then, in one aspect a signal is displayed to the user. Alternatively, the mobile computer application may be configured so that the recording does not commence until the mobile device is sufficiently still such that the shake threshold is not exceeded. In one aspect of the invention, shake is detected using one or more motion sensors built into the device, the mobile application being configured to access output from the motion sensors, and to apply the mentioned shake threshold. In a still other aspect, the mobile computer application may initiate the capture of video content, because the mobile device is sufficiently still however, the mobile device may commence shaking past the threshold, in which case the mobile computer program may initiate the deletion of the video content at the point in the video where the shaking passed the threshold, and the user is given the option of either using the video segment that is sufficiently still, or rerecording. A skilled reader will understand that other possible features or functions may be used to address the impact of shake on video capture using a mobile device.

It should be understood that a number of image stabilization algorithms may be used prior to editing, and for creating user directed animations of digital photos, in order to avoid the drift that otherwise would be noticeable at the boundary of the static and dynamic regions of the digital image.

For example a Fast Fourier Transform (FFT) may be used, and more specifically an image stabilization routine may be implemented consisting of:
a) applying a Fast Fourier Transform (FFT) on the captured source images;
b) For each of the non-base frame images: (A) using the FFTs of the image and the base frame image and computing the Cross Power Spectrum, (B) obtaining the phase correlation by performing IFFT on the result from (A), and (C) offsetting the image by the phase correction, thus aligning it with the base frame.

In one aspect, the mobile application may be configured to provide step by step instructions to the user for creating cinemagraphs using the mobile application.

Optionally, the mobile application presents a menu that enables the user to pre-select a particular duration for the video. In another particular implementation of the invention, mobile application presents a countdown button showing during the capture of the video the expiry of the selected duration of the video. This feature may help the user to keep the mobile device still during the entire duration of the selected video capture. Various other mechanisms are possible for addressing stability. For example motion sensing features of the mobile device may be used to sense when motion is crossing one or more different thresholds, and if these thresholds are crossed, an indicator may be initiated such as a visual or sound indicator, alerting the user to the need to stabilize the mobile device.

(4) The mobile application may generate and display to the user one or more image frames from the video segment. Alternatively, the mobile application may include a slider that enables the user to navigate within the video segment to access image frames extracted from particular points in the video segment. The frame selected is referred to in this disclosure as the "base frame". A slider or similar tool may also be used to select one or more portions of video content to be used as the moving content to animate the base image.

(5) The user of the mobile application selects one or more regions of the base frame for animation, using a suitable input means. In a particular aspect of the present invention, the mobile application implements a masking feature similar for example to the masking metaphor use in PHOTOSHOP™ for other purposes, such that the user "paints" the regions of the base frame that are selected for animation. By "painting" the following is meant the path of the movement of the user's finger over the image (or of a stylus or other input means), based on touch functionality for example of screen of a mobile device or a tablet computer.

In one particular aspect of the invention, the mask is inverted such that it represents the region of the image that will remain static. The base frame image (the image from the set of captured images that will remain static) is masked with the inverted mask so that the animated region is transparent. The set of images are animated underneath the marked base frame image to give the illusion of the final product, thus providing the animated preview feature of the present invention.

The selective, and possibly iterative editing of the image, using painting, and then revealing the underlying animation (generated based on the preview feature mentioned) and adjusting the boundaries of the animation as they relate to the still image, provides an easy to use and highly tunable mechanism that translates well to all manner of computer programs, including mobile applications and tablet computer applications. The application of this technique for the purpose of the invention, and also in the manner described in this disclosure, represents a novel and innovative departure from the prior art.

In one aspect of the technical implementation of the present invention, a base frame is used as a mask for the underlying animation. Once the cinemagraph is generated, the viewer is viewing the still base frame, and underneath the still base frame selected animated portions of the video, the boundaries of which correspond to the regions of the still base frame "painted" by the user.

In a particular implementation, the mobile application is configured to enable the user to select a "paint" button or equivalent, and then using a touch screen interface of the mobile device, using a finger or a stylus, touching the touch screen of the mobile device in a cinemagraph creation mode to "paint" the regions of the base frame for animation. In another possible feature of the present invention, the pinch/unpinch gesture may be used to zoom in and out respective from the base frame to enable more precise definition of the regions selected from animation.

In a particular implementation of the invention, the mobile application is configured such that a live animation preview is generated and displayed during the cinemagraph creation phase, in order to provide a preview of the high level view of the appearance of the to be generated cinemagraph. This permits the user to determine whether s/he is happy with the expected cinemagraph, or alternatively whether s/he wishes to modify the selected animation of the image frame, for example, by adjusting contours of the one or more regions for animation. In one implementation, this preview is generated and displayed upon clicking a "PREVIEW" button or equivalent.

(6) Once the user has selected the desired animated features (and optionally enhanced the cinemagraph using any other tools provided) the cinemagraph is rendered and stored. The output file is created, for example as an animated GIF based on the set of images. The output file may be generated by the mobile application, or a remote computer (such as an associated server computer and server application) upon receipt of a message containing instructions from the mobile application based on compilation of user instructions for creating the cinemagraph. The output file in the case of IOS may be an animated GIF created using the Core Graphic library. In other platforms other graphics libraries may be used. It should be understood that movie file formats or FLASH™ may also be used to create the selective animations at issue. The output file may also be generated as an HDI file.

Possible Streamlined Workflow

In another possible aspect of the invention, a streamlined workflow is provided for creating cinemagraphs.

The streamlined workflow is based on the use of a solid base frame (or anchor frame) but the video plays in transparency behind it, allowing the user to view the entirety of the video in real time, and still seeing the difference between the anchor frame and the rest of the video. The mobile application allows the user to selectively touch the mobile device's screen to "remove" a mask on touch and reveal underlying selected animated features as shown in FIG. 1. FIG. 1. shows an image of a shoreline, in which the cloud is moving and the waves are moving. A region of the shore and moving waves is selected by a user. In the embodiment of the invention previously described a "preview" feature or equivalent was selected by the user in order to view a cinemagraph preview, in which the partially still, and partially animated (the wave portion being animated) image is generated and presented.

In accordance with another aspect of the streamlined workflow, the mobile device includes an automated rendering feature, such that once a region of the mask is removed by the user, to reveal a region that is associated with animated content, the mobile application automatically integrates the selected portion of animated content so as to reveal, dynamically in conjunction with the selection of the animated portions by the user, one or more previews of the cinemagraph generated based on the user's selections. The preview cinemagraph, in one aspect, consists of the mask consisting of the base image and including selectively animated portions, shown in their moving state.

In another aspect of the invention, the mobile application includes a touch sensing feature. The touch sensing feature may be operable to determine when a user is touching the touch screen, and then when the user has ceased touching the touch screen. In one particular implementation of the invention, the mobile application is configured such that the cinemagraph preview feature is initiated upon the user, in connection with a cinemagraph creation session that involves touching portions of the image on a touch screen, ceasing to touch the touch screen. The method may be used iteratively so as to view the preview, and—initiating a "back" button or equivalent—redo an aspect of the selection of portions of the image to animate, or by touching an additional portion of the image to select additional portions of the image to animate. This may be repeated until the user selects "STORE CINEMAGRAPH" or equivalent.

A skilled reader will understand that this particular feature streamlines the workflow of the mobile application and computer implemented method described to the following steps:

(A) a user initiates a cinemagraph creation session;
(B) a user is presented a still image in the form of a mask, or a user selects a still image which is presented in the form of a mask;
(B) the user, in one or more iterations, selects portions of the still image for animation by rubbing the touch screen to remove selectively portions of the mask; and
(D) upon the user ceasing the rubbing of the touch screen in connection with the cinemagraph creation session, a preview cinemagraph showing the still portions and selectively animated portions is generated and presented to the user.

More specifically, in one embodiment of the present invention, in the cinemagraph session: (i) the computer system displays the video in full, (ii) with a transparency in the background that shows the currently selected anchor frame while the video is playing (such that at this point no mask is displayed), (iii) upon the user initiating the editing features of the computer system for selectively animating portions of the cinemagraph (which may be triggered by the user touching the display area showing the video during the cinemagraph), the mask appears automatically to aid the user in selecting with precision the regions to be animated, and (iv) as previously described, upon the user removing pressure to the touch screen, the computer automatically shows the final cinemagraph without the mask and with only the selected regions moving.

In a further possible implementation of the present invention the transparency in the background may be implemented by showing a currently selected anchor frame without, or with close to no, opacity while the video segment is played with a reduced opacity. In a further example of implementation, the anchor frame is displayed at around 100% clarity (i.e. no opacity or close to no opacity), and the video segment is played at around 50% opacity. Given that the anchor frame and the video segment are aligned, the user receives visual indication as to the nature and extent of the motion prior to painting or drawing. Thereafter, for example even if the user draws one line, and disengages from the touch screen, the transparency effect disappears and the cinemagraph (or cinemagraph created to this point) is shown in a preview.

Once the user is satisfied with the result, the cinemagraph may be rendered, either on the mobile device or in the cloud.

A skilled reader will understand that the process described is very intuitive, and permits the user to easily create high quality cinemagraphs by allowing the user to view their work immediately, and where further changes may be required, make further selections for animation and view their work. This workflow integrates the generation of previews with the cinemagraph creation process so as to provide an efficient workflow for achieving the desired result, a beautiful cinemagraph.

Other Possible Features

In another possible features, illustrated in one embodiment in FIG. 2, the mobile application may include a motion detection feature that automatically detects areas of video content that are moving, for example beyond a threshold. In the content displayed in FIG. 2, the mobile application may detect that the waves, and the cloud are the two main areas that are moving in the video. In another aspect, the motion detection feature may include one or more filters that detect areas of motion that are suitable for use for creation of cinemagraphs. The motion detection feature may be further configured to designate the general area of motion, by circumscribing same to indicate the general area of movement, using one or more suitable cropping algorithms. Where the motion detection feature detects two or more moving areas, the mobile application may generate thumbnails indicating the possible combinations of these moving areas, including combinations where one or more of the moving areas is filtered out, as shown in the bottom portion of the user interface displayed as part of FIG. 2. This allows the user to select a particular base image with the desired moving areas being shown. The shown moving areas may be used as a starting point to select the moving portions to be shown, or alternatively, the user may select a preview to be shown using the specific areas already shown. The user may also select different animation effects for different moving areas, which is aided by this feature of the invention.

Optionally, the user may access one or more editing functions of the mobile application. These editing functions may be accessed by means of one or more "trays" disposed around the bottom of the user interface. These trays may include "Start/End", "Looping" and "Filters".

In another possible feature of the mobile application, program features may be included that enable the selection of the start frame and end frame for a cinemagraph. In the particular implementation shown, a line (optionally a dotted line) is shown, representing the sequence of image frames obtainable from the video segment, from the first frame to the last frame. The user may select a point along the line to access particular frames to consider whether the frame is suitable as the starting frame or the ending frame. It may be desirable to choose a starting frame and an ending frame that are a close match. A user may toggle between the "Starting Frame" button and the "Ending Frame" to test the appearance of different selections.

In particular aspect, the mobile application is configured so that when a particular point on the line is selected, the corresponding image frame number may also be displayed. In another particular aspect, the tray may be closed once the user is happy with the selected "Starting Frame" and the "Ending Frame".

The mobile application may include one or more possible editing functions for example one or more looping functions. These functions enable the user to loop the animation one or more times from the beginning to the end, or from then end to the beginning. This is to avoid the "snap back" to the beginning of the animation that would normally occur, and therefore presents as a smoother animation. In addition, the loop functions enable the definition of the length of the delay between animations.

The mobile application may include various other editing functions such as for example image/video filters such as "MOODY" or "RETRO" or "Black & White".

System Implementation

Figure 3:
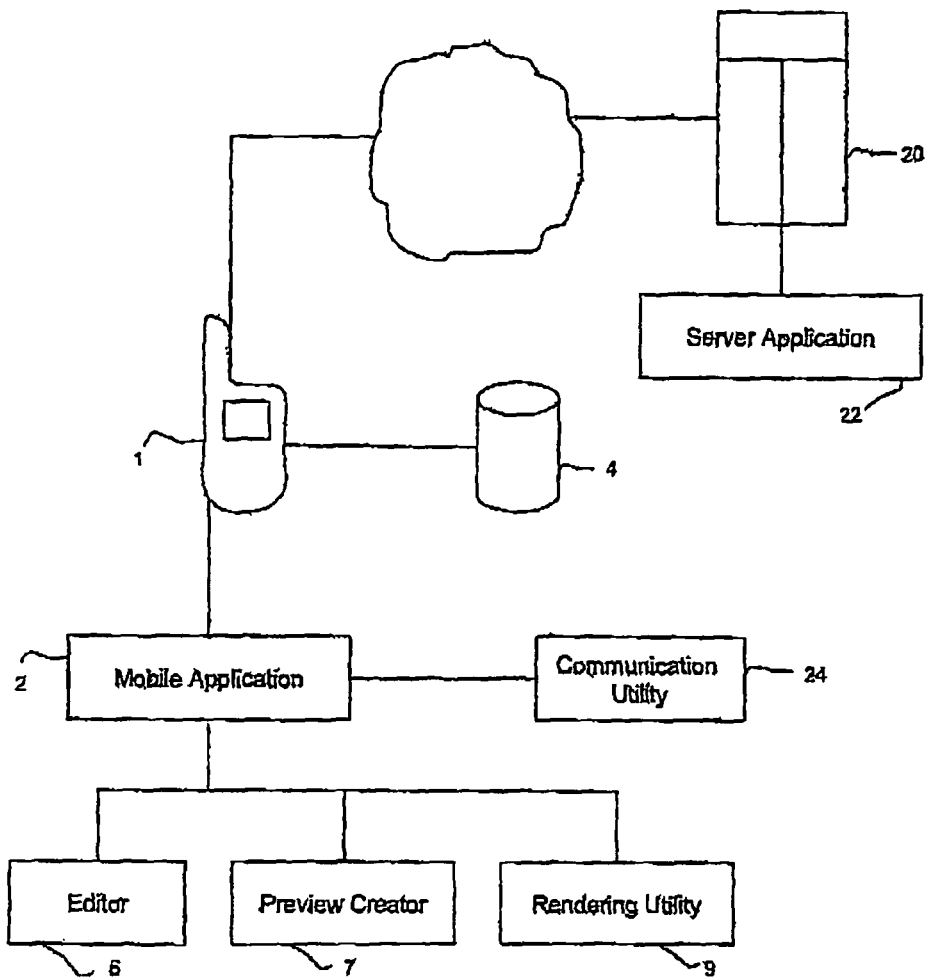
FIG. 3 illustrates a representative architecture for the system of the present invention.

As best illustrated in FIG. 3, the mobile application (2) may define: a video capture utility (3), which links to the camera of the mobile device, a video library (4), consisting of a media store located on the mobile device (1) or associated with a server (20) or web service link. The mobile application (2) also includes a video editor (6) that incorporates the various functions described above. The mobile application (2) includes a preview creator (7) for generating the easy to use animation previews described above. The mobile application (2) also includes a rendering utility (9) for generating the images with user defined animated regions.

As mentioned above, this component may also be linked to a server computer (20), and implemented to an associated server application (22). Various functions of the mobile application (2) may be implemented on the mobile device (1), the server application (22), or a combination of the two. The present invention contemplates various distributions of the functions described, including the use of a cloud service for one or more of the functions.

The system of the present invention is best understood as the mobile application (2) implemented to a mobile device (1), but the system may also include the server computer (20), or in fact the system may include a desktop computer (not shown) including or linked to a computer program that is configured to implement the features or operations described herein.

The system of the invention may include or be linked to a communication platform (24) that enables email messaging and also linking with established social networking platforms such as as FACEBOOK™ or TWITTER™ for example, including for the purpose of sharing the animated digital photos of described herein.

It should be understood that the mobile application (10) may include a settings utility (13) that enables the user to create a user profile (23) for the user, which may include for example first, name, last name, country of domicile, a valid email, and password. The user profile (23) may include other information such as contact information, application login information, account information for social networks (for example username and password), and also preferences related to for example (a) settings for uploading the animated digital photos to remote resources whether the server computer (20) or related services such as social networking platforms or image sharing platforms, or (b) preferences for automated creation or editing of animated digital photos, as described.

The user profile (23) may include for example a social sharing profile that specifies the social networks that the user belongs to and also preferences for sharing content with specific social networks.

A plurality of mobile devices linked to the mobile application may be used to create, and publish to an Internet server or service a plurality of cinemagraphs, which may be stored to one or more databases. The cinemagraphs may be organized into one or more libraries. The Internet service may be organized as a community to share and distribute cinemagraphs, similar to other prior art online communities based on image sharing. In one implementation, streaming and discovery features similar to those used for example in Youtube™ may be used in order to create a platform for multiple users to discover and consume cinemagraphs.

In another aspect, the mobile application may include functionality that enables users to aid in the tagging of their cinemagraphs. This information may improve the ability of the Internet service to enable users (including different types of users) to locate cinemagraphs of interest.

The Internet service may include or link to a computer program that analyzes cinemagraphs based on one or more criteria so relevant to the character or quality of cinemagraphs. This feature may be used for example to filter out or rank low images that either do not contain animated features, or for which substantially all of a baseline image was selected for animation such that the resulting image is essentially the video content.

The Internet service may include an automated ranking utility for ranking cinemagraphs.

The Internet service may include various social media features, and may include or link to a social media platform. Users may recommend cinemagraphs to their friends; receive cinemagraphs meeting one or more criteria as social feeds; and share cinemagraphs based on content important to a user's social network, to the user's social network, and so on.

Various revenue models may be associated with the mobile application and also the Internet service described. For example, the Internet service may be used to find high quality cinemagraphs, and these may be stored to a library presented for example to premium clients of the platform through a dashboard. The operator of the Internet service may acquire distribution rights to cinemagraphs and commercialize these rights, or the Internet service may act as conduit between creators (using the mobile application and the platform) and possible consumers of the cinemagraphs such as advertisers and brands.

Regarding (a), the settings utility (13) may implement one or more known features for minimizing the cost of wireless data transfer, for example one or more rules that may enable the user to select the transfer of the animated digital photos to remote computer only once the mobile device is connected to a preferred network meeting one or more parameters, for example a free WiFi network. These rules may be for example user defined, using one or more drop down menus or other mechanisms for selecting rules presented by a user interface associated with the settings facility (13), or may be obtained based on other user defined settings associated with other mobile applications of the user.

Different Possible Implementations

It should be understood that the present disclosure may explain the invention by reference to a number of example implementations that describe certain functionality being implemented by the mobile application (2) and other functionality being implemented by the server application (22). It should be understood that various of these features associated in the disclosure with the mobile application (10) may also be implemented by the server application (22), or alternatively features associated in the disclosure with the server application (22) may be implemented by the mobile application (22). As a still other alternative, some features may be implemented on a distributed basis with some operations occurring on the mobile device (12) and others on the server (20) side. Depending on the particular implementation and various associated factors such as the resources of the mobile device, wireless network parameters, and requirements of the content distribution of social media platforms, different implementation architectures may be used for the present invention.

It should also be understood that the server (20) may be implemented as one or more servers in any possible server architecture or configuration including for example in a distributed server architecture, a server farm, or a cloud based computing environment.

Figure 4:
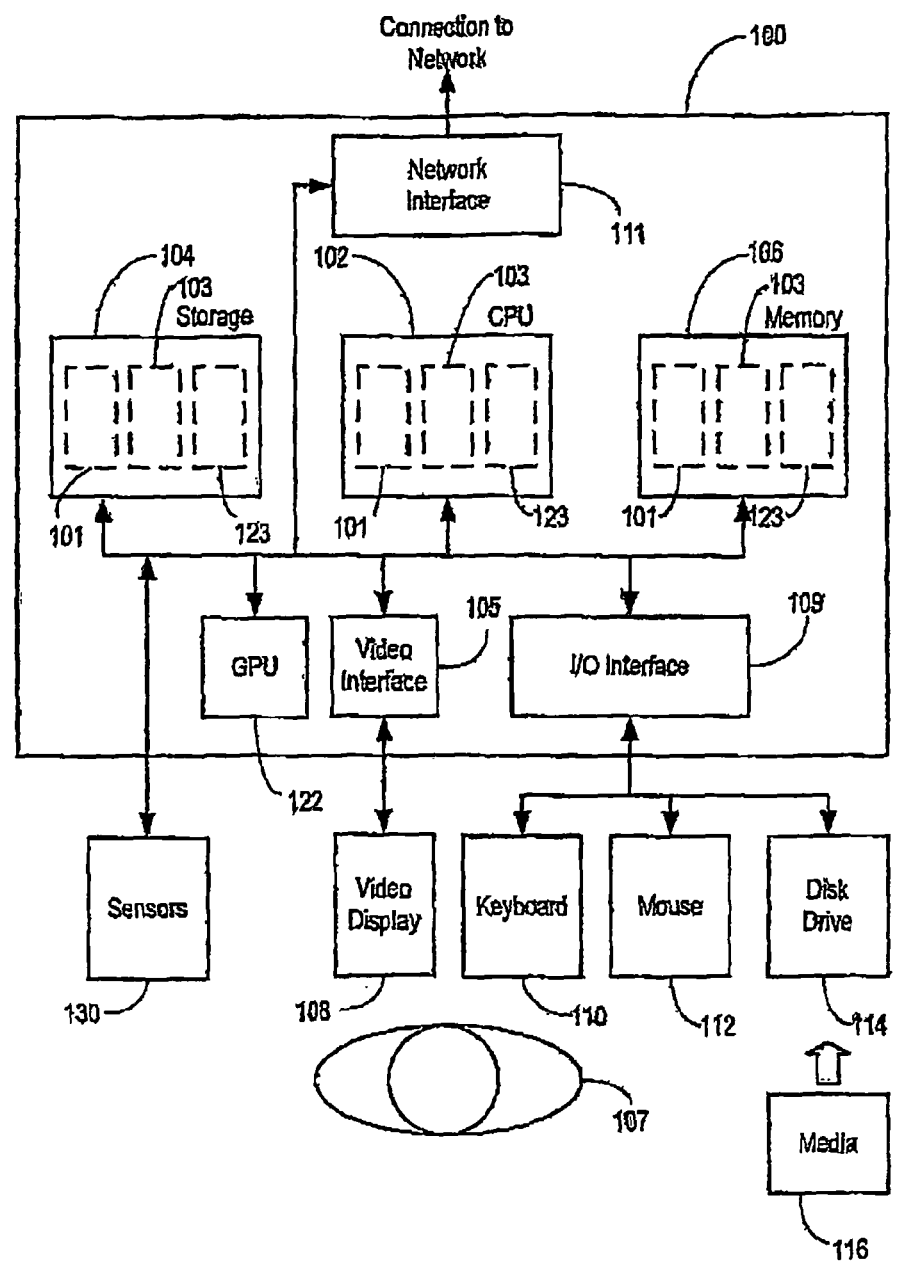
FIG. 4 represents a generic computer implementation of the features of the invention.

The present system and method may be practiced in various embodiments. A suitably configured computer device, and associated communications networks, devices, software and firmware may provide a platform for enabling one or more embodiments as described above. By way of example, FIG. 4 shows a generic computer device 100 that may include a central processing unit ("CPU") 102 connected to a storage unit 104 and to a random access memory 106. The CPU 102 may process an operating system 101, application program 103, and data 123. The operating system 101, application program 103, and data 123 may be stored in storage unit 104 and loaded into memory 106, as may be required. Computer device 100 may further include a graphics processing unit (GPU) 122 which is operatively connected to CPU 102 and to memory 106 to offload intensive image processing calculations from CPU 102 and run these calculations in parallel with CPU 102. An operator 107 may interact with the computer device 100 using a video display 108 connected by a video interface 105, and various input/output devices such as a keyboard 110, mouse 112, and disk drive or solid state drive 114 connected by an I/O interface 109. In known manner, the mouse 112 may be configured to control movement of a cursor in the video display 108, and to operate various graphical user interface (GUI) controls appearing in the video display 108 with a mouse button. The disk drive or solid state drive 114 may be configured to accept computer readable media 116. The computer device 100 may form part of a network via a network interface 111, allowing the computer device 100 to communicate with other suitably configured data processing systems (not shown). One or more different types of sensors 130 may be used to receive input from various sources.

The present system and method may be practiced on virtually any manner of computer device including a desktop computer, laptop computer, tablet computer or wireless handheld. The present system and method may also be implemented as a computer-readable/useable medium that includes computer program code to enable one or more computer devices to implement each of the various process steps in a method in accordance with the present invention. In case of more than computer devices performing the entire operation, the computer devices are networked to distribute the various steps of the operation. It is understood that the terms computer-readable medium or computer useable medium comprises one or more of any type of physical embodiment of the program code. In particular, the computer-readable/useable medium can comprise program code embodied on one or more portable storage articles of manufacture (e.g. an optical disc, a magnetic disk, a tape, etc.), on one or more data storage portioned of a computing device, such as memory associated with a computer and/or a storage system.

The mobile application of the present invention may be implemented as a web service, where the mobile device includes a link for accessing the web service, rather than a native application.

The functionality described may be implemented to any mobile platform, including the iOS platform, ANDROID™, WINDOWS™ or BLACKBERRY™.

It will be appreciated by those skilled in the art that other variations of the embodiments described herein may also be practiced without departing from the scope of the invention. Other modifications are therefore possible.

The invention claimed is:

1. A method of generating selectively animated images, the selectively animated images being at least one of distributable and shareable, the method comprising:
   (a) opening a client computer program, implemented as a client computer program loaded on a mobile device;
   (b) capturing or accessing video content;
   (c) a user using a user interface of the client computer program to:
      (i) select one or more base frames from the video content for use as one or more still images; and
      (ii) draw or paint one or more paths or regions on the one or more base frames so as to select one or more animated regions, the one or more animated regions including a path or region of the one or more base frames to be animated using moving content from the video content;
   (d) compiling one or more parameters related to the one or more animated regions, and also optionally one or more other parameters generated using one or more editing features or utilities of the client computer program, so as to define a set of instructions for creating selectively animated images within the one or more animated regions, based on the video content, and the client computer program initiating, at the mobile device or via a server linked to the mobile device, the composition of a series of images including user selected animated regions, by rendering one or more animated images based on the one or more base frames and selected animated regions
   (e) playing the video content, while displaying in the background a transparency showing the currently selected one or more base frames;
   (f) touching, by the user in a selectively animated image creation mode, selected regions of a touch screen display of the mobile device to initiate the client computer program to display a mask including the one or more base frames, as an overlay to the moving content, thereby permitting the user to touch the touch screen so as to select portions of the mask and thereby selected portions of the one or more base frames for animation; and
   (g) dynamically displaying a preview of the current selectively animated images based on the portions of the one or more base frames selected for animation, upon the user ceasing touch input to the selected regions of the touch screen display of the mobile device.

2. The method of claim 1, wherein the client computer program displays a mask as an overlay over the one or more base frames, wherein the mask represents the region of the one or more base frames that will remain still, wherein the user draws on or paints on the mask, and thereby removes portions of the mask, and these portions are used to select the one or more animated regions.

3. The method of claim 1, further comprising displaying to the user a preview of the selective animated images by displaying the one or more base images as one or more still images, and revealing underneath the aligned portions of the moving content in the one or more animated regions.

4. The method of claim 1, further comprising:
   the user iteratively providing the one or more parameters for the one or more animated regions by touching selected regions of the touch screen display; and
   viewing a corresponding preview, until the user provides input to the client computer program indicating completion of the selectively animated images.

5. The method of claim 1, further comprising the client computer program automatically analyzing the video content based on one or more parameters for determining whether the video content is suitable for creating selectively animated images.

6. The method of claim 5, further comprising analyzing the video segment for shake.

7. The method of claim 5, further comprising applying an image stabilization mechanism.

8. The method of claim 1, further comprising initiating from the mobile device, by operation of the client computer program, at least one of distribution and sharing of the animated image.

9. A computer system for generating selectively animated images, the selectively animated images being at least one of distributable and shareable, the computer system comprising:
   (a) one or more server computers being linked to a server computer program; and
   (b) at least one mobile device linked to the one more server computers, the mobile device implementing a client computer program;
   wherein the server computer program and the client computer program, when executed, are configured to:
      (i) presenting at the mobile device a user interface enabling a user of the mobile device to:
         (A) select one or more base frames from the video content for use as one or more still image; and
         (B) draw or paint one or more paths or regions on the one or more base frames so as to select one or more animated regions, the one or more animated regions including a path or region of the one or more base frames to be animated using moving content from the video content; and
      (ii) compile one or more parameters related to the one or more animated regions, and also optionally one or more other parameters generated using one or more editing features or utilities of the client computer program, so as to define a set of instructions for creating selectively animated images within the one or more animated regions, based on the video content, and the client computer program initiating, at the mobile device or at the one or more server computers, the composition of a series of images including user selected animated regions, by rendering one or more animated images based on the one or more base frames and selected animated regions (iii) play the video content, while displaying in the background a transparency showing the currently selected one or more base frames;

(iv) enable the user in a selectively animated image creation mode to touch selected regions of a touch screen display of the mobile device to initiate the client computer program to display a mask including the one or more base frames, as an overlay to the moving content, thereby permitting the user to touch the touch screen so as to select portions of the mask and thereby selected portions of the one or more base frames for animation; and (v) dynamically display a preview of the current selectively animated images based on the portions of the one or more base frames selected for animation, upon the user ceasing touch input to the selected regions of the touch screen display of the mobile device.

10. The computer system of claim 9, wherein the client computer program displays a mask as an overlay over the one or more base frames, wherein the mask represents the region of the one or more base frames that will remain still, wherein when executed the client computer program permits the user to draw on or paint on the mask, and thereby remove portions of the mask, and these portions are used to select the one or more animated regions.

11. The computer system of claim 9, wherein the client computer program is configured to display to the user a preview of the selective animated images by displaying the one or more base images as one or more still images, and reveals underneath the aligned portions of the moving content in the one or more animated regions.

12. The computer system of claim 9, where the client computer program is configured to enable the user to iteratively provide the one or more parameters for the one or more animated regions by touching selected regions of the touch screen display and viewing a corresponding preview, until the user provides input to the client computer program indicating completion of the selectively animated images.

13. The computer system of claim 9, wherein the client computer program is configured to receive input from the user and, based on the input from the user, connect to the one or more servers so as to enable at least one of distribution and sharing of the selectively animated images based on one or more user preferences.

* * * * *